United States Patent
Cousins et al.

(10) Patent No.: US 8,197,695 B2
(45) Date of Patent: *Jun. 12, 2012

(54) ABSORBENTS

(75) Inventors: Matthew John Cousins, Darlington (GB); Robert Logan, Billingham (GB); Christopher John Young, Hartlepool (GB)

(73) Assignee: Johnson Matthey PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/867,829

(22) PCT Filed: Jan. 29, 2009

(86) PCT No.: PCT/GB2009/050085
§ 371 (c)(1),
(2), (4) Date: Aug. 16, 2010

(87) PCT Pub. No.: WO2009/101429
PCT Pub. Date: Aug. 20, 2009

(65) Prior Publication Data
US 2010/0320153 A1    Dec. 23, 2010

(30) Foreign Application Priority Data
Feb. 15, 2008  (GB) .................. 0802828.4

(51) Int. Cl.
*C02F 1/42* (2006.01)
*B01D 53/02* (2006.01)
*B01J 20/00* (2006.01)

(52) U.S. Cl. ............ 210/688; 210/914; 95/133; 95/134; 502/400; 502/414; 502/407

(58) Field of Classification Search ............... 210/688, 210/914; 95/134, 133; 502/400, 414, 407
See application file for complete search history.

(56) References Cited

U.S. PATENT DOCUMENTS

| | | | | |
|---|---|---|---|---|
| 2,665,259 | A * | 1/1954 | Buffett | 502/63 |
| 3,143,410 | A * | 8/1964 | Smith | 71/64.07 |
| 4,094,777 | A * | 6/1978 | Sugier et al. | 210/670 |
| 4,909,926 | A | 3/1990 | Yan | |
| 4,996,181 | A | 2/1991 | Denny | |
| 5,053,209 | A * | 10/1991 | Yan | 423/210 |

(Continued)

FOREIGN PATENT DOCUMENTS
EP  0 480 603 B1  4/1992
(Continued)

OTHER PUBLICATIONS

Huang, Helen Y., R. T. Yang, D. Chinn, C. L. Munson, 2003. "Amine-Grafted MCM-48 and Silica Xerogel as Superior Sorbents for Acidic Gas Removal from Natural Gas", Ind. Eng. Chem. Res. 42: 2427-2433 (2003).*

(Continued)

*Primary Examiner* — Nam Nguyen
*Assistant Examiner* — Nader Hossaini
(74) *Attorney, Agent, or Firm* — RatnerPrestia

(57) ABSTRACT

An absorbent composition suitable for removing mercury, arsenic or antimony from fluid streams includes 5-50% by weight of a particulate sulphided copper compound, 30-90% by weight of a particulate support material, and the remainder one or more binders, wherein the metal sulphide content of the absorbent, other than copper sulphide, is below 5% by weight.

20 Claims, 2 Drawing Sheets

U.S. PATENT DOCUMENTS

| | | |
|---|---|---|
| 5,245,106 A | 9/1993 | Cameron |
| 5,350,728 A | 9/1994 | Cameron |
| 6,221,241 B1 | 4/2001 | Carnell |
| 6,444,601 B1 * | 9/2002 | Purcell et al. .................. 502/62 |
| 2003/0091851 A1 | 5/2003 | Khor |
| 2006/0148642 A1 * | 7/2006 | Ryu et al. ........................ 502/84 |

FOREIGN PATENT DOCUMENTS

| | | |
|---|---|---|
| EP | 0 484 233 B1 | 5/1992 |
| EP | 0 487 370 B1 | 5/1992 |
| EP | 0 628 337 A1 | 12/1994 |
| GB | 1533059 | 11/1978 |
| WO | WO 2005047438 A1 * | 5/2005 |

OTHER PUBLICATIONS

Huang, Helen Y., R. T. Yang, D. Chinn, C. L. Munson, 2003. "Amine-Grafted MCM-48 and Silica Xerogel as Superior Sorbents for Acidic Gas Removal from Natural Gas", Ind. Eng. Chem. Res. 42:2427-2433.*

International Preliminary Report for PCT/GB2009/050085 dated Jun. 29, 2010.

Written Opinion of the International Searching Authority for PCT/GB2009/050085 dated Jun. 29, 2010.

* cited by examiner

ABSORBENTS

CROSS-REFERENCE TO RELATED APPLICATIONS

This application is the U.S. National Phase application of PCT International Application No. PCT/GB2009/050085, filed Jan. 29, 2009, and claims priority of British Patent Application No. 0802828.4, filed Feb. 15, 2008, the disclosures of both of which are incorporated herein by reference in their entirety for all purposes.

FIELD OF THE INVENTION

This invention relates to absorbents and in particular to metal sulphide absorbents suitable for capturing mercury and/or arsenic and antimony from fluid streams.

BACKGROUND OF THE INVENTION

Mercury is found in small quantities in fluid streams such as hydrocarbon or other gas and liquid streams. Arsenic and antimony may also be found in small quantities in hydrocarbon streams. Mercury, in addition to its toxicity, can cause failure of aluminium heat exchangers and other processing equipment. Therefore there is a need to efficiently remove these metals from fluid streams, preferably as early as possible in the process flowsheet.

Copper sulphide mercury removal materials are known. U.S. Pat. No. 4,094,777 discloses the use of a pre-sulphided absorbent comprising copper sulphide for the absorption of mercury from a natural gas stream containing mercury. The pre-sulphided absorbent is prepared by forming a precursor comprising basic copper carbonate and a refractory cement binder, and then contacting the precursor with a gaseous stream containing a sulphur compound, e.g. hydrogen sulphide, so as to sulphide the copper compound. The pre-sulphided absorbent is then used to remove mercury from a natural gas stream.

EP 0480603 describes a process for the removal of mercury from a stream wherein an absorbent comprising copper sulphide is prepared in situ, preferably by a mercury-containing stream also containing a sulphur compound thereby concomitantly preparing the mercury absorbent and absorbing the mercury, such that the formation of ineffective and undesired metal compounds e.g. metal sulphates, formed by oxidation of metal sulphides, is avoided. The Examples utilize copper and zinc sulphide materials. However, not all gas streams containing mercury also contain sulphur compounds.

SUMMARY OF THE INVENTION

We have found that the presence of metal sulphates, such as zinc sulphate, formed by the oxidation of metal sulphides other than copper sulphide, can cause agglomeration of the absorbent as a result of dissolution and re-deposition of metal sulphate by water present in the fluid stream. Re-deposition in use can cause a reduction in mercury capacity through loss in reactive copper sulphide surface area. Agglomeration can cause an unacceptable increase in pressure drop, and can make discharge of the absorbent from the absorption vessel difficult and lengthy. This may cause a particular problem where purification is required as part of an off-shore hydrocarbon extraction process or where purification is required in wet gas streams such as regeneration gases from dehydration units or wet carbon dioxide streams.

Accordingly, the invention provides an absorbent composition suitable for removing mercury, arsenic or antimony from a fluid stream comprising 5-50% by weight of a particulate sulphided copper compound, 30-90% by weight of a particulate support material, and the remainder one or more binders, wherein the metal sulphide content of the absorbent, other than copper sulphide, is $\leqq 5\%$ by weight.

The invention further provides a method for making the absorbent comprising the steps of:
i) forming a composition comprising a particulate copper compound capable of forming copper sulphide, a particulate support material, and one or more binders,
ii) shaping the composition to form an absorbent precursor,
iii) drying the absorbent precursor material, and
iv) sulphiding the precursor to form the absorbent.

The invention further provides a mercury, arsenic or antimony removal process comprising contacting a mercury-, arsenic- or antimony-containing process fluid with the absorbent.

BRIEF DESCRIPTION OF THE DRAWINGS

The invention is further described by reference to the following Figures in which.

DETAILED DESCRIPTION OF THE INVENTION

Figure 1:
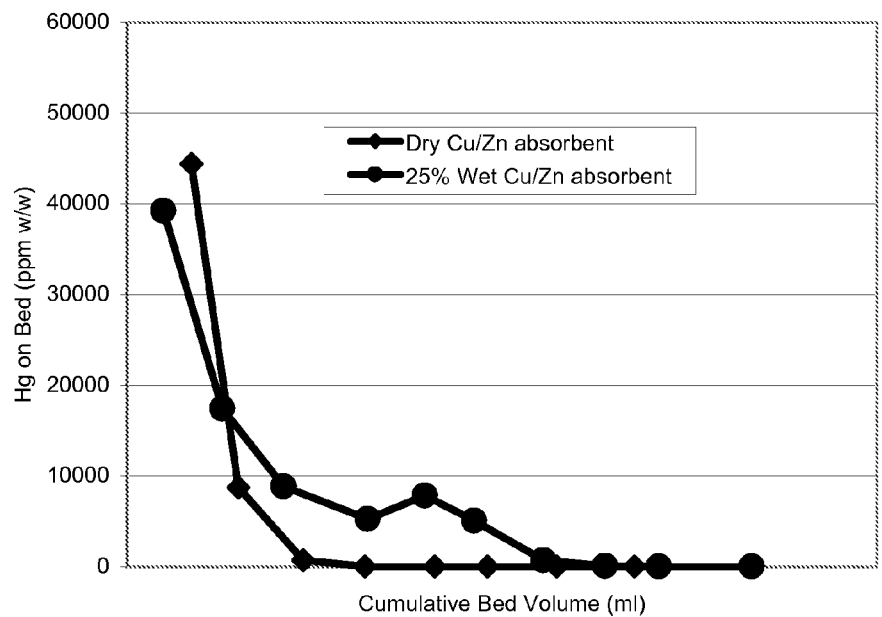
FIG. 1 is a graph depicting the Hg absorption profiles of a wet and a dry pre-sulphided comparative Cu/Zn/alumina absorbent not according to the invention.

The absorbent comprises 5-50% by weight of a particulate sulphided copper compound. The sulphided copper compound therefore comprises copper sulphide. Preferably >90% wt of the copper is sulphided, preferably >95% wt. Absorbents used in the present invention preferably comprise copper in an amount 10-45% wt (expressed as the oxide, CuO), preferably, more preferably 15-30% wt Cu (as oxide) in the sulphided composition.

The copper compound suitable for use in the absorbent is one that may be readily sulphided such as copper oxide, hydroxide and/or basic carbonate. One or more sulphidable copper compounds maybe used. A particularly suitable copper compound is basic copper carbonate (i.e. a copper hydroxycarbonate). Preferably the copper compound used to form the absorbent is pre-dried. The copper compounds are particulate and desirably are in the form of powders, preferably with an average, i.e. $D_{50}$, particle size in the range 10-100 μm.

Unlike the aforesaid U.S. Pat. No. 4,094,777, the absorbents of the present invention comprise 30-90% by weight of a particulate support material. The support material offers a means to adapt the physical properties of the absorbent to the duty. Thus the surface area, porosity and crush strength of the absorbent may suitably be tailored to its use. Furthermore, the presence of support particles can increase the strength and durability of the absorbent composition by acting as a diluent. The absorbent composition is then better able to retain its physical integrity during the sulphiding process, which causes a volumetric change in the copper compound as the copper sulphide is formed. Support materials are desirably oxide materials such as aluminas, titanias, zirconias, silicas and aluminosilicates, or mixtures of two or more of these. Hydrated oxides may also be used, for example alumina trihydrate or boehmite. Particularly suitable supports are transition aluminas, such as gamma, theta and delta alumina, and hydrated aluminas. The support may be present in an amount 30-90% wt, preferably 50-80% wt (based upon on the sulphided composition). The support materials are desirably in the form of powders with a particle size of <100 μm, preferably 5-65 μm.

In the present invention, the total metal sulphide content of the absorbent, other than other than copper sulphide, is below 5% by weight. This is so that the corresponding water-soluble metal sulphates are formed in sufficiently low levels not to cause the undesirable re-deposition and agglomeration problem. Preferably the total metal sulphide content, other than copper sulphide, is ≦1% wt, more preferably ≦0.5% wt, especially ≦0.1% wt. The contaminant metal sulphide may be one or more of zinc sulphide, iron sulphide, nickel sulphide, chromium sulphide and manganese sulphide. They may be introduced by contamination of the copper compound, support material or binders. Accordingly the low contaminant metal sulphide level required by the present invention may be achieved by the selection of high purity copper compound, support and binder material, and by the exclusion of contaminant metal compounds from the composition. Copper compounds, e.g. copper hydroxycarbonates, often contain small amounts of zinc. Hence, it is preferable that their zinc content is <0.5% by weight (expressed as the oxide, ZnO), more preferably <0.2% by weight (as oxide).

It should be understood that the sulphided copper compound may be susceptible to the formation of copper sulphate, but we have found that this is less important than the formation and presence of the other metal sulphates, in particular zinc sulphate, which has a considerably higher solubility in water than copper sulphate under the typical conditions for mercury removal.

The absorbent composition comprises one or more binders, making up the remaining part of the absorbent. Preferably the total amount of the one or more binders is in the range 2-20% by weight (based on the sulphided composition). The preferred binders include cement materials, including calcium aluminate cements and related materials such as ciment fondue. The cement binders react when treated with water to form stable hydrates that bind the particulate copper compound and support particles together to form a strong composition.

The absorbent materials can undergo considerable physiochemical changes upon treatment with sulphur compounds to form the active copper sulphide phase known to be effective for mercury, arsenic or antimony removal. The physiochemical change, even where support materials are included, can result in reduced crush strength and an increased susceptibility to attrition, particularly with high metal sulphide containing materials. It is therefore desirable to increase the crush strength whilst maintaining attrition resistance. We have found that a combination of binders and support material in the absorbent overcomes this problem. Furthermore, by using the two binders we have found that the amount of support material may be increased compared to prior art materials without sacrificing rate of mercury absorption, strength or attrition resistance.

Thus in a preferred embodiment, the absorbent composition comprises a first binder and a second binder, wherein the first binder is a cement binder and the second binder is a high aspect ratio binder having an aspect ratio>2.

The first binder is preferably a cement binder, in particular a calcium aluminate cement. By the term calcium aluminate cement we include such calcium aluminate compounds as calcium monoaluminate ($CaO.Al_2O_3$), tricalcium aluminate ($3CaO.Al_2O_3$), pentacalcium trialuminate ($5CaO.3Al_2O_3$), tricalcium penta aluminate ($3CaO.5Al_2O_3$), dodeca calcium hepta aluminate ($12CaO.7Al_2O_3$) and high alumina cements which may contain alumina in admixture with, dissolved in, or combined with such calcium aluminate compounds. For example, a well-known commercial cement has a composition corresponding to about 18% wt calcium oxide, 79% wt alumina and 3% wt water and other oxides. Another suitable commercially available calcium aluminate cement has a composition corresponding to about 40% wt calcium oxide, about 37% wt alumina, about 6% wt silica and about 20% other oxides.

The second binder is preferably a high aspect ratio binder having an aspect ratio>2. By the term high aspect ratio we mean that the ratio between the maximum dimension and the minimum dimension of the particles is >2. The particles may thus be plate-like where the length and breadth are at least twice the thickness. Alternatively, and preferably, the particles are acicular, wherein the average length is at least twice, preferably at least 2.5 times, the breadth, e.g. having a "rod" configuration wherein the cross sectional dimensions, i.e. breadth and thickness are approximately equal, or a "lath" configuration, wherein the thickness is significantly less than the breadth. Suitable high aspect ratio binders include clays such as aluminosilicate clays, preferably an aluminium-magnesium silicate clay, commonly referred to as an Attapulgite clay. Without wishing to be bound by theory, we believe that the acicular nature of this binder comprising elongate particles with an aspect ratio>2 contributes to the improved physical properties obtained. We have found surprisingly that the combination of these two types of binder in combination with the sulphided copper compound and support are capable of providing absorbent materials of high crush strength and low attrition, and which are water tolerant, as well as providing a suitably high rate of mercury absorption.

The amount of the first binder may be in the range 1 to 10% by weight based on the un-sulphided absorbent precursor composition. The amount of the second binder may be in the range 1 to 10%, preferably 2 to 5% by weight on the un-sulphided absorbent precursor. Preferably, the relative amounts of the binders are 1:1 to 3:1 first to second binder.

A particularly preferred absorbent composition comprises one or more particulate sulphided copper compounds and a particulate alumina or hydrated alumina support material, bound together with the first and second binders, wherein the zinc content of the absorbent is ≦0.1% by weight (expressed as oxide).

The absorbent may usefully be prepared by forming a composition comprising a particulate copper compound capable of forming copper sulphide, a particulate support material, and one or more binders, shaping the composition to form an absorbent precursor, drying the absorbent precursor material, and sulphiding the absorbent precursor to form the absorbent. Hence the invention also includes an absorbent precursor comprising a copper compound capable of forming copper sulphide, a particulate support material, and one or more binders, wherein the sulphidable metal content of the absorbent precursor, other than copper, is below 5% by weight (as oxide).

The absorbent comprising the sulphided copper compound may be in any suitable physical form, e.g. as a granule, extrudate, or tablet so that the mercury-containing stream may be contacted with a bed of solid absorbent particles. The absorbent composition preferably has a particle size within the range 1-15 mm, more preferably 1-10 mm.

The absorbent precursor may be in the form of tablets or pellets formed by moulding a suitable powder composition, generally containing a material such as graphite or magnesium stearate as a moulding aid, in suitably sized moulds, e.g. as in conventional tabletting or pelleting operation. Alternatively, the shaped units may be in the form of extrudes formed by forcing a suitable composition, containing the absorbent precursor material and often a little water and/or a moulding aid through a die followed by cutting the material emerging from the die into short lengths. For example extrudes may be made using a pellet mill of the type used for pelleting animal feedstuffs, wherein the mixture to be pelleted is charged to a rotating perforate cylinder through the perforations of which the mixture is forced by a bar or roller within the cylinder: the resulting extruded mixture is cut from the surface of the rotating cylinder by a doctor knife positioned to give extruded pellets of the desired length. Alternatively, and preferably, the absorbent or absorbent precursor may be in the form of agglomerates formed by mixing the absorbent precursor material with a little water, insufficient to form a slurry, and then causing the composition to agglomerate into roughly spherical, but generally irregular, granules. Granulated absorbents with a particle size range of 2 to 5 mm are especially preferred.

If desired the absorbent or absorbent precursors may be heated or treated in another way to accelerate the setting of the cement binder.

The different shaping methods have an effect on the surface area, porosity and pore structure within the shaped articles and in turn this often has a significant effect on the absorption characteristics and on the bulk density.

The sulphiding agent used to sulphide the absorbent precursor may be one or more sulphur compounds such as hydrogen sulphide, carbonyl sulphide, mercaptans and polysulphides, or mixtures of these. Hydrogen sulphide is preferred. Using a hydrogen sulphide-containing gas mixture is considerably easier and faster than using alternatives such as solutions of sulphur or sulphur compounds such as polysulphides. The gas mixture may, if desired, contain other sulphur compounds such as carbonyl sulphide or volatile mercaptans. Inert gases such as nitrogen, helium or argon may also be present. The sulphiding gas mixture is preferably free of reducing gases such as hydrogen and carbon monoxide, but these may be present where the sulphiding step is performed at temperatures below 150° C., particularly below 100° C. Hydrogen sulphide is preferably provided to the precursor in gas streams at concentrations of 0.1 to 5% by volume. Sulphiding temperatures in the range 1-100° C., preferably 5-50° C. may be used.

The sulphiding step may be performed on the dried absorbent precursor ex-situ in a sulphiding vessel through which a sulphiding agent is passed, or the sulphiding step may be performed in situ, in which case an absorbent precursor is installed and undergoes sulphidation in the vessel in which it is used to absorb mercury compounds. In-situ sulphiding may be achieved using a sulphiding agent stream or where the stream containing mercury also contains sulphur compounds, the mercury-containing stream. Where such concomitant sulphiding and mercury absorption occurs, the amount of sulphur compound that is present depends on the type of sulphur compound and metal compound used. Usually, a concentration ratio, as defined by the ratio of sulphur compound (expressed as hydrogen sulphide) concentration (v/v) to mercury concentration (v/v), of at least one, and preferably of at least 10 is used so that the precursor is sufficiently sulphided. Should the initial concentration of the sulphur compound in the feed stream be below the level necessary to establish the desired ratio of sulphur compound to mercury compound concentration then it is preferred that the concentration of the sulphur compound is increased by any suitable method.

In contrast to the previous absorbents, e.g. as described in the aforesaid EP 0480603, the absorbent according to the present invention is preferably pre-sulphided. Pre-sulphiding avoids problems caused by the change in volume and strength of the sorbent that can accompany the sulphiding step.

The mercury capacity of the absorbent is proportional to its sulphur content. However very high copper sulphide absorbents often do not have the necessary strength and durability. Furthermore copper is an expensive metal component. The present invention provides an optimised combination of sulphur content and physical properties compared to current commercially available materials.

In order to provide process-efficient materials that allow for suitable absorption vessel sizes, it is preferred that the density of the absorbent, expressed as the sulphur density, is in the range 50 to 200 kg S/m$^3$.

The present invention may be used to treat both liquid and gaseous fluids containing mercury, arsenic or antimony. In one embodiment, the fluid is a hydrocarbon stream. The hydrocarbon stream may be a refinery hydrocarbon stream such as naphtha (e.g. containing hydrocarbons having 5 or more carbon atoms and a final atmospheric pressure boiling point of up to 204° C.), middle distillate or atmospheric gas oil (e.g. having an atmospheric pressure boiling point range of 177° C. to 343° C.), vacuum gas oil (e.g. atmospheric pressure boiling point range 343° C. to 566° C.), or residuum (atmospheric pressure boiling point above 566° C.), or a hydrocarbon stream produced from such a feedstock by e.g. catalytic reforming. Refinery hydrocarbon steams also include carrier streams such as "cycle oil" as used in FCC processes and hydrocarbons used in solvent extraction. The hydrocarbon stream may also be a crude oil stream, particularly when the crude oil is relatively light, or a synthetic crude stream as produced from tar oil or coal extraction for example. Gaseous hydrocarbons may be treated using the process of the invention, e.g. natural gas or refined paraffins or olefins, for example. Off-shore crude oil and off-shore natural gas streams in particular may be treated with the absorbent of the present invention. Contaminated fuels such as petrol or diesel may also be treated. Alternatively, the hydrocarbon may be a condensate such as natural gas liquid (NGL) or liquefied petroleum gas (LPG), or gases such as a coal bed methane, landfill gas or biogas.

Non-hydrocarbon fluids which may be treated according to the invention include carbon dioxide, which may be used in enhanced oil recovery processes or in carbon capture and storage, solvents for decaffeination of coffee, flavour and fragrance extraction, solvent extraction of coal etc. Fluids, such as alcohols (including glycols) and ethers used in wash processes or drying processes (e.g. triethylene glycol, monoethylene glycol, Rectisol™, Purisol™ and methanol), may be treated by the inventive process. Mercury may also be removed from amine streams used in acid gas removal units. Natural oils and fats such as vegetable and fish oils may be treated by the process of the invention, optionally after further processing such as hydrogenation or transesterification e.g. to form biodiesel.

Other fluid streams that may be treated include the regeneration gases from dehydration units, such as molecular sieve off-gases, or gases from the regeneration of glycol driers.

Feed streams which are susceptible to being treated by the absorbents may also include those which inherently contain both mercury, arsenic or antimony and a sulphur compound e.g. certain natural gas streams, or a mercury-, arsenic- or antimony-containing stream to which a sulphur compound has been added to effect mercury, arsenic, or antimony absorption.

The present invention is of particular utility where the fluid contains water, preferably in low levels in the range 0.02 to 1% vol. Higher levels up to 5% vol may be tolerated for short periods. The absorbents of the present invention may be regenerated simply after prolonged exposure to water simply by purging with a dry gas, preferably a dry inert gas such as nitrogen.

Preferably the absorption of mercury is conducted at a temperature below 150° C., preferably at or below 120° C. in that at such temperatures the overall capacity for mercury absorption is increased. Temperatures as low as 4° C. may be used to good effect in the present invention. A preferred temperature range is 10 to 60° C.

The mercury may be in the form of elemental mercury, or organomercuric, or organomercurous compounds. The present invention is particularly effective in removing elemental mercury although other forms of mercury may be removed for short periods. Typically the concentration of mercury in a gaseous feed stream is from 0.01 to 1100 $\mu g/Nm^3$, and more usually between 10 to 600 $\mu g/Nm^3$.

In use, the absorbent material may be placed in an absorption vessel and the fluid stream containing mercury is passed through it. Desirably, the absorbent is placed in the vessel as one or more fixed beds according to known methods. More than one bed may be employed and the beds may be the same or different in composition. The gas hourly space velocity through the absorbent may be in the range normally employed.

EXAMPLES

Unless otherwise stated, absorbent precursor particles were prepared using a granulation technique wherein the solid components were combined with a little water and mixed to form granules in a Hobart mixer. The precursors were sulphided using a dilute hydrogen sulphide stream using known methods. The precursor materials were taken to a fully sulphided state using 1% $H_2S$ in an inert carrier gas, (typically $N_2$) at ambient temperature and pressure.

Example 1

Comparative

In order to assess the problems caused when water is present, 25 ml of a 1-2 mm-sized particulate granulated absorbent comprising sulphided copper and zinc compounds, alumina support and single cement binder was charged to a tubular lab-scale absorption vessel (i.d. 18 mm). The copper content of the sulphided absorbent was 45% wt (as oxide) and the zinc content was 22% wt (as oxide).

The lower 25 wt % by volume of the bed was made up from a pre-soaked absorbent. The material was immersed in demineralised water for 30 minutes at ambient temperature, then the water was decanted off and the particles touch-dried with absorbent paper. The remaining upper 75% by volume of the bed was dry material. N-hexane saturated with elemental mercury to ca. 1 ppm (w/v) was passed upwards through the bed at ambient temperature (about 20° C.) such that the fluid contacted the water-soaked material and then the dry material, at a Liquid Hourly Space Velocity (LHSV) of 7.0 $hr^{-1}$ for 750 hours. Exit samples were taken from the reactor exit line and analysed on a PSA modified Hewlett Packard 6890 GC to monitor mercury levels. At the end of the test, the bed was discharged into 9 equivalent discrete sub-beds, which were analysed for total mercury content by ICP-Optical Emission Spectroscopy.

The bed profile of the absorbent charged with the inlet 25% wet in comparison with an entirely dry bed used in the same test is shown in FIG. 1.

No elemental mercury was detected from the reactor exit stream during the 750 hours in which the test was carried out. As the test run progressed, a white solid was observed to form at the interface between the initially wet granules and the dry granules. Agglomeration was also observed at this interface.

In comparison with the wet material, the dry absorbent profile is sharp, with the majority of the mercury pickup confined to the first 6-10 ml of the bed volume. However, with water present in the inlet 25% of the bed volume, the mercury pickup slides down the bed and results in a much lazier profile with the reaction zone being extended. This would result eventually in a faster breakthrough of mercury from the vessel. A second reaction front is also observed, where the mercury pickup of the bed increases at about 48% along the bed after a minimum. The minimum point at about 30% down the bed corresponds to the section of the bed that was white in colour and had agglomerated. As one progresses further down the bed, the mercury pickup increases.

It may be concluded from this data that the area that was white in colour and had agglomerated had a reduced capability to remove mercury from the liquid hydrocarbon stream.

When water is present, the copper and zinc sulphides are converted to sulphates. Without wishing to be bound by any theory, It is thought that the reduced mercury absorption is due to a combination of zinc sulphate's high solubility in water and its subsequent coating of the copper sulphide-sulphate rich granules further down the bed, resulting in a decrease in the capability of the bed to remove mercury.

Example 2

Dry Testing

Absorbent precursor compositions were prepared in a granulator with the following compositions;
20 or 30 parts by weight of a flash-dried copper hydroxycarbonate,
80 or 70 parts by weight of alumina trihydrate,
14 parts by weight of binders comprising 10 parts of a calcium aluminate cement having a CaO content of about 40% wt, plus 4 parts Attapulgite clay).

The granules were dried at 105° C. in air for 16 hours after a period of 2 hours at ambient temperature (ca 20° C.). The size range of granules obtained was 1-5 mm.

The granulated materials were sulphided in the laboratory to saturation in 1% $H_2S$ to generate the active absorbent.

Figure 2:
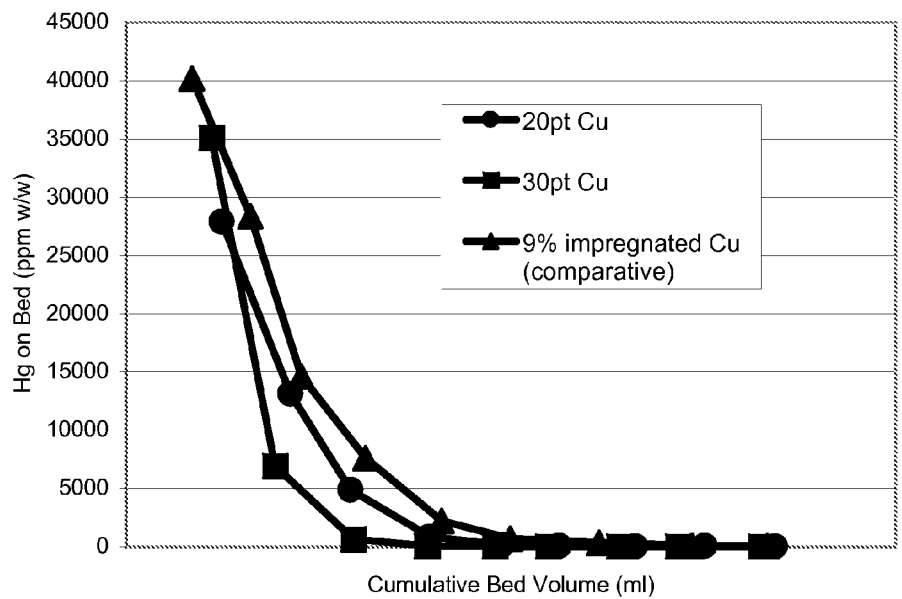
FIG. 2 is a is a graph depicting the Hg absorption profiles of two dry pre-sulphided Cu/alumina absorbents according to the invention in comparison with a commercially available pre-sulphided 9% wt Cu (as oxide) impregnated alumina absorbent not according to the invention.

The sulphided absorbents were run in the test as described in Example 1, although the beds in each case were run dry and not pre-soaked. The test was repeated on a commercially available pre-sulphided 9% wt Cu (as oxide) impregnated alumina absorbent. The results are depicted in FIG. 2. The results show that both compositions according to the invention were effective in removing Hg from the fluid, with the higher Cu content material providing a sharper bed profile. The compositions according to the present invention also provide a sharper bed profile than the commercially available impregnated Cu on alumina material.

Example 3

Wet Testing

An absorbent precursor composition was prepared in a granulator with the following composition;
25 parts by weight of a flash-dried copper hydroxycarbonate,
75 parts by weight of alumina trihydrate,
14 parts by weight of binders comprising 10 parts of a calcium aluminate cement having a CaO content of about 40% wt, plus 4 parts Attapulgite clay).

The granules were dried at 105° C. in air for 16 hours after a period of 2 hours at ambient temperature (ca 20° C.). The size range of granules obtained was 1-5 mm.

The granulated materials were sulphided in the laboratory to saturation in 1% $H_2S$ to generate the active absorbent.

Figure 3:
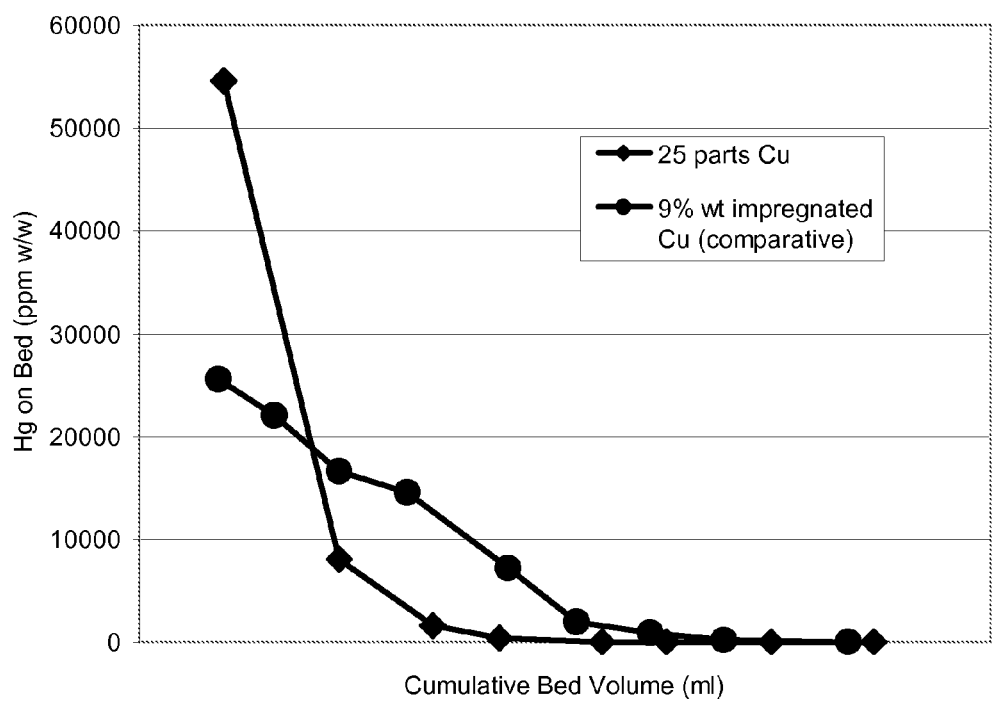
FIG. 3 is a graph depicting the Hg absorption profiles of a wet pre-sulphided Cu/Alumina absorbent according to the invention in comparison with a wet commercially available pre-sulphided 9% wt Cu (as oxide) impregnated alumina absorbent.

The sulphided absorbent was run as tested in Example 1 with the first 25% vol of the bed pre-soaked in demineralised water. The test was repeated on a commercially available presulphided 9% wt Cu (as oxide) impregnated alumina absorbent, again with the first 25% of the bed pre-soaked. The results are depicted in FIG. 3.

The absorbent according to the present invention showed no signs of agglomeration or colour change at the wet/dry interface. The comparative 9% wt Cu impregnated alumina material, although being copper-only, suffered from the presence of water, with mercury pickup continuing into about 72% of the thickness of the bed.

A series of tests was performed to establish the physical properties of the sulphided absorbents in Examples 1 and 3, and the 9% wt Cu commercially available material. In respect of the Cu/Zn composition of Example 1, the physical properties were determined on a 2-5 mm granulate for better comparison.

i) Tapped Bulk Densities (TBD)

60 ml of absorbent granules (size cut 2-5 mm) were weighed into a 100 ml plastic measuring cylinder. The density was calculated by dividing the mass by the volume. The cylinder was manually tapped to achieve a constant volume. The density was calculated by dividing the mass by the tapped volume (TBD).

ii) Mean Crush Strength

An Engineering Systems CT-5 was used to measure the mean crush strength (MCS) of the absorbent granules. The instrument was fitted with a 5 kg load cell and calibrated. The granules selected for testing were sized 3-4. mm, in order to reduce the effect of granule size on crush strength. Twenty granules of each absorbent were crushed and a statistical analysis performed.

iii) Sulphur Analysis

Analysis for sulphur content was performed using a LECO SC632, by combustion and the subsequent infrared measurement of sulphur dioxide.

iv) Pore Structure Analysis

The samples were outgassed at 140° C. for 1 hour with a nitrogen purge prior to BET surface area/isotherm measurements.

v) X-Ray Fluorescence (XRF)

Semi-quantitative XRF analysis was performed using a Philips Magix-Pro/Bruker SRS3400. The results estimate the relative abundance of each element in the absorbent samples by comparison of their relative peak intensities.

The results are given in Table 1. The compositions for the materials of Examples 1 and 3 have been calculated from theoretical mass balances, whereas the composition of the impregnated material was determined by XRF analysis.

TABLE 1

| Description | Example 1 Comparative Cu/Zn on alumina granulated with cement binder | Example 3 Cu on alumina granulated with mixed binders | Comparative 9% wt Cu impregnated alumina support |
|---|---|---|---|
| Precursor | | | |
| Cu (% wt as oxide) | 54 | 21.75 | — |
| Zn (% wt as oxide) | 27 | 0.06 | — |
| Al (% wt as oxide) | 14 | 72 | — |
| Ca (% wt as oxide) | 3 | 4 | — |
| Mg (% wt as oxide) | 0.00 | 0.43 | — |
| Na (% wt as oxide) | 0.07 | 0.07 | — |
| Sulphided | | | |
| Cu (% wt as oxide) | 47 | 20 | 11.1 |
| Zn (% wt as oxide) | 23 | 0.05 | 0.00 |
| Al (% wt as oxide) | 12 | 64 | 83 |
| Ca (% wt as oxide) | 2 | 3 | 0.04 |
| Mg (% wt as oxide) | 0.00 | 0.40 | 0.00 |
| Na (% wt as oxide) | 0.05 | 0.06 | 0.19 |
| Tests on sulphided absorbent | | | |
| TBD (g cm$^3$) | 0.76 | 1.06 | 0.65 |
| MCS (kg) | 1.13 | 2.39 | 1.33 |
| Sulphur (%) | 21 | 8 | 6.7 |
| Sulphur Density kg/m$^3$ | 160 | 85 | 43.6 |
| BET Surface Area (m$^2$g$^{-1}$) | 53.6 | 12.3 | 59.2 |
| Pore Volume (cm$^3$g$^{-1}$) | 0.27 | 0.05 | 0.41 |
| Average Pore Diameter (Å) | 203 | 174 | 276 |

An increase in crush strength is observed for the absorbent of the present invention. The sulphur density is also higher than for the impregnated material.

The invention claimed is:

1. An absorbent composition for removing mercury, arsenic or antimony from a fluid stream having a total metal sulphide content, comprising 5-50% by weight of a particulate sulphided copper compound and 30-90% by weight of a particulate support material, bound together by 5-20% by weight of two or more binders comprising a first binder and a second binder, wherein the first binder is a cement binder and the second binder is a high aspect ratio binder having an aspect ratio >2 and wherein the total metal sulphide content of the absorbent, other than copper sulphide, is $\leq 5\%$ by weight.

2. An absorbent according to claim 1 wherein the sulphided copper compound is sulphided basic copper carbonate, sulphided copper hydroxide, sulphided copper oxide or mixtures of these.

3. An absorbent according to claim 1 wherein the first binder is a calcium aluminate cement binder.

4. An absorbent according to claim 1 wherein the second binder is an aluminosilicate clay.

5. An absorbent according to claim 1 wherein the second binder is an Attapulgite clay.

6. An absorbent according to claim 1 wherein the relative amounts of the first and second binder are in the range 1:1 to 3:1 (first to second binder).

7. An absorbent according to claim 1 wherein the total metal sulphide content, other than copper sulphide, is $\leq 0.5\%$ wt.

8. An absorbent according to claim 1 wherein the total metal sulphide content, other than copper sulphide, is $\leq 0.1\%$ wt.

9. An absorbent according to claim 1 wherein the density of the absorbent, expressed as the sulphur density, is in the range 50 to 200 kg S/m$^3$.

10. A method for making the absorbent according to claim 1 comprising the steps of:
   i) forming a composition comprising a particulate copper compound capable of forming copper sulphide, a particulate support material and binders comprising a first binder and a second binder, wherein the first binder is a cement binder and the second binder is a high aspect ratio binder having an aspect ratio >2,
   ii) shaping the composition to form an absorbent precursor,
   iii) drying the absorbent precursor material to form a dried absorbent precursor, and
   iv) sulphiding the precursor to form the absorbent.

11. A method according to claim 10 wherein the sulphiding step is performed by reacting a sulphur compound selected from hydrogen sulphide, carbonyl sulphide, mercaptans and polysulphides with the metal compound capable of forming a metal sulphide in the dried absorbent precursor.

12. A process for removing mercury, arsenic or antimony from a process fluid comprising contacting said fluid with an absorbent according to claim 1.

13. A mercury removal process according to claim 12 wherein the mercury containing fluid contains water in an amount in the range 0.02 to 5% vol.

14. A mercury removal process according to claim 12 wherein the fluid is a hydrocarbon stream.

15. A mercury removal process according to claim 13 wherein the fluid is an off-shore hydrocarbon stream or a regeneration stream from a hydrocarbon dehydration unit.

16. A method according to claim 10 wherein the sulphiding step is performed on the dried absorbent precursor ex-situ in a sulphiding vessel through which a sulphiding agent is passed, or in situ in a vessel in which the absorbent is used to absorb mercury compounds using a sulphiding agent stream, or a mercury-containing stream that also contains sulphur compounds.

17. A method according to claim 10, wherein the particulate support material is an alumina, hydrated alumina, titania, zirconia, silica or aluminosilicate, or a mixture of two or more of these.

18. An absorbent precursor composition for preparing an absorbent according to claim 1, comprising a copper compound capable of forming copper sulphide a particulate support material, bound together by two or more binders comprising a first binder and a second binder, wherein the first binder is a cement binder and the second binder is a high aspect ratio binder having an aspect ratio >2, and wherein a sulphidable metal content of the absorbent precursor, other than copper, is below 5% by weight as oxide.

19. An absorbent according to claim 1 wherein the particulate support material is an alumina, hydrated alumina, titania, zirconia, silica or aluminosilicate, or a mixture of two or more of these.

20. An absorbent according to claim 1 wherein the total metal sulphide content, other than copper sulphide, is $\leq 1\%$ wt.

* * * * *